United States Patent [19]
Sermanet

[11] 3,899,930
[45] Aug. 19, 1975

[54] COUPLING DEVICE FOR FLUIDS AND ITS APPLICATION TO THE MEASUREMENT OF LEVELS AND THE STORAGE OF LIQUIDS

[75] Inventor: Gerard Sermanet, Yerres, France

[73] Assignee: L'Air Liquide, Societe Anonyme pour l'Etude et l'Exploitation des Procedes Georges Claude, Paris, France

[22] Filed: Aug. 5, 1974

[21] Appl. No.: 495,104

[30] Foreign Application Priority Data
Aug. 17, 1973 France................ 73.29991

[52] U.S. Cl. ............ 73/299; 73/401; 73/420; 137/637.1
[51] Int. Cl.[2] ........................ G01G 23/14
[58] Field of Search ............ 73/299, 420, 401, 205; 137/637.1

[56] References Cited
FOREIGN PATENTS OR APPLICATIONS
815,370   6/1959   United Kingdom............ 137/637.1

OTHER PUBLICATIONS
King Manometers for Plant & Lab Catalog 2008, September 1962, p. 22, King Engineering Corp., Ann Arbor, Mich.

Primary Examiner—S. Clement Swisher
Attorney, Agent, or Firm—Lee C. Robinson, Jr.

[57] ABSTRACT

The invention relates to a coupling device for fluids of the kind employed, for example, in coupling together a level-measuring apparatus and a tank of cryogenic liquid, and enabling all errors of operation to be prevented. It also relates to a measuring device constituted by the fluid-coupling device and the measuring apparatus, and also a device constituted by a tank of cryogenic liquid equipped with a measuring device of this kind.

The fluid-coupling device comprises a first conduit with a first input and a first outlet and incorporates a first cock or first isolating cock, a second conduit with a second input and a second outlet and a second cock or second isolating cock, a third conduit coupled between the first and second conduits at points located between said isolating cocks and said outlets and incorporating a balancing cock, said device being further provided with closure-preventing means comprising movable abutment members fixed on the operating shafts of each of said cocks, and adapted to prevent the closure of said balancing cock when at least one of said isolating cocks is closed, and further preventing the closure of each isolating cock when the balancing cock is closed.

17 Claims, 6 Drawing Figures

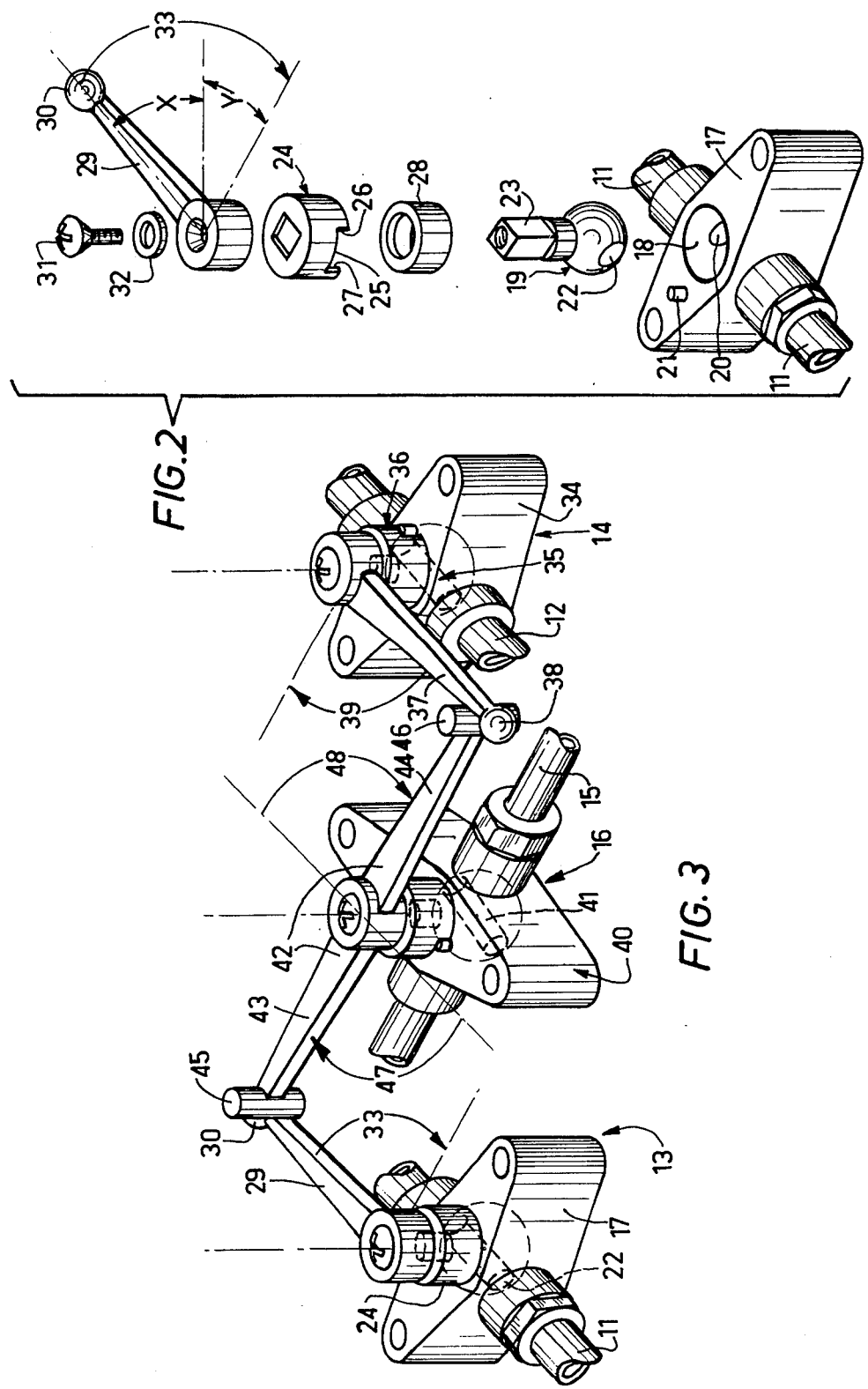

COUPLING DEVICE FOR FLUIDS AND ITS APPLICATION TO THE MEASUREMENT OF LEVELS AND THE STORAGE OF LIQUIDS

The present invention relates to a coupling device for fluids of the kind employed in coupling together for example, a level-measuring apparatus and a tank of cryogenic liquid and enabling all errors of operation to be prevented. It also relates to a measuring device constituted by the coupling device for fluids and a measuring apparatus, and also a device for storing cryogenic liquid constituted by a tank of cryogenic liquid equipped with a measuring device of this kind.

In order to check the liquid level in a cryogenic tank, the difference in pressure due to the weight of the liquid is generally measured between conduits coupled to the bottom of the tank and to its upper portion; the apparatus for measuring the difference in pressure is of a conventional type. In order to prevent errors of measurement due to the presence of liquid in the lower conduit of the tank, matters are arranged so that the liquid becomes vaporized there. The conduit has poor heat insulation in a zone close to the tank and slightly inclined, in which a liquid level becomes established substantially facing the bottom of the tank, so that the pressure of the gas above this level is equal to that existing at the bottom of the tank.

The measurement of the level is thus reduced to a measurement of the pressure difference between two gaseous phases at the outlets of the upper conduits of the tank.

In the known art, the coupling device coupling together the outlets of the upper and lower conduits of the tank at the inlets of the measuring apparatus comprises three conduits each provided with a closure cock. The conduits include two measuring conduits each provided with an isolating cock couple the outlets of the tank conduits to the inlets of the measuring apparatus; a third conduit, known as the balancing conduit, provided with a cock known as the balancing cock, connects the arms of the measuring conduits together, located between the measuring apparatus and the isolating cocks.

In the measuring position, the balancing cock is closed and the isolating cocks are open; the gaseous fluids from the tank conduits reach the inlets of the measuring apparatus. In the waiting or checking position, the isolating cocks are closed and the balancing cock is open; the two inputs of the measuring apparatus are then directly connected together, and are thus necessarily at the same pressure, which enables the zero indication of the instrument to be verified.

The conventional instruments for measuring the difference in pressure fall essentially into two types. In the first type, the two inputs are connected to two chambers separated by an elastic diaphragm fixed on a spring which has furthermore a fixed point and therefore opposes the movements of the diaphragm. The pressures to be compared are applied on each side of the diaphgram and the difference in pressures results in a force applied to the spring and therefore in a deformation of this latter which is proportional to the difference in pressure.

In the second type, there is employed a vertical U-tube containing a liquid such as mercury. The pressures to be compared are applied to the tops of the two arms of the U-tube, and the difference in pressure pushes the liquid from one side of the tube so that the difference in level between the two arms is proportional to the difference in pressures. The two inputs of the apparatus are the extremities of the arms of the U-tube, or are connected to these extremities.

Measuring apparatus such as that described above, if they are to be accurate, must have a limited range of measurement. Apparatus for level measurement is designed for example so as to measure a difference of a few hundred millibars between the pressures which may reach several multiples of ten bars when these instruments are connected to a storage tank under high pressure.

This disproportion involves risk of destruction for the apparatus in a certain number of cases described below, and in particular if accidentally one of the inputs of the measuring apparatus is at atmospheric pressure, and the other is connected to the receptacle under high pressure. The difference in pressures applied to the measuring apparatus then considerably exceeds that provided for normal working of the apparatus.

This has the following disadvantages: in the diaphragm type of apparatus, the excessive force applied on the diaphragm may cause its destruction in spite of the protective abutment devices which are often provided. It is then necessary to replace the measuring apparatus; in the type of measuring apparatus with a U-tube, the liquid in the tube is then in this case expelled from the tube into the piping systems, which renders the apparatus unusable and may involve risks for the remainder of the equipment. When the liquid is mercury, it attacks chemically parts of the apparatus of copper or brass, such as cocks, or it blocks-up one of the low-temperature conduits by solidifying. It is then often necessary to empty the tank so as to carry out a repair for which the apparatus must be heated.

In any case, an incident of this kind results in an interruption of the measurements which may be very undesirable in certain cases where it is vital to know the state of reserves of liquid, for example in certain medical applications of liquid oxygen tanks supplying breathing apparatus.

In the present state of the art, in order to attempt to reduce to a certain extent the number of such incidents, there is precisely utilized the balancing conduit actually connecting together the two inputs of the measuring apparatus. The apparatus is in fact protected if the balancing cock is open. The pressure at the inputs of the apparatus are then balanced in such manner that, even if they are high, the apparatus cannot be damaged.

There is thus adopted a method of use of the measuring apparatus which effects the opening of the balancing cock whenever a risk exists for the measuring apparatus. The description which follows of this method of use makes it clear that, while it is theoretically satisfactory, there is nothing to guarantee that it will be followed under all circumstances. This is actually found in practice in which the accidents for which the invention proposes a remedy are numerous.

First operation — Replacing in position the measuring apparatus after a repair.

As the tank is under pressure, the isolating cocks are closed and prevent the gases from escaping to atmosphere. Before connecting the measuring apparatus, the balancing cock must be opened. In fact, as soon as the inputs of the measuring apparatus are connected to the measuring conduits, when the balancing cock is closed and when one of the isolating cocks is not perfectly fluid-tight, the fluid under pressure gradually fills the corresponding measuring conduit and is applied to the corresponding input of the apparatus, whereas the other measuring conduit remains at atmospheric pressure, as it was before connection. The measuring apparatus may then be damaged as the difference in pressure is too high. On the other hand, if the balancing cock is open during the placing in position, the fluid under pressure in the badly-closed measuring conduit is able to reach simultaneously the two inputs of the measuring apparatus, thus eliminating all risk.

Second operation — Measurement.

The apparatus is connected and in the waiting position; the two isolating cocks are closed and the balancing cock is open.

In order to carry out a measurement, the isolating cocks are then opened. An absolutely simultaneous opening can never actually be obtained in practice due to the inaccuracies of the operating devices. The balancing cock is then closed. The two inputs of the apparatus are then connected solely to the tank and the measurement is correct.

Quite obviously, the measurement would be inaccurate if it were forgotten to re-close the balancing cock. An incorrect operation starting from the waiting position above — isolating cocks closed, balancing cock open — consists of closing first the balancing cock and then trying to open the isolating cock simultaneously. Generally, one of the cocks begins to open before the other and the pressure of the tank is then transmitted to the corresponding input of the measuring apparatus. As the other isolating cock is closed, the other input of the measuring apparatus remains at the pressure which existed previously. This pressure may be atmospheric pressure if the apparatus had just been connected or if a leakage, even small, to the atmosphere, has enabled the gas under pressure which it contained to escape gradually towards the atmosphere.

In this case, the measuring apparatus may be damaged.

Third operation — Taking-down.

When the apparatus must be taken-down, to be repaired for example, the apparatus is first placed in the waiting position: isolating cocks closed, balancing cock open. The two inputs of the apparatus are then successively disconnected from the corresponding measurement conduits. At the moment when the first conduit is disconnected, the gas under pressure escapes to the atmosphere, directly in the case of one of the measuring conduits, and through the intermediary of the balancing conduit for the other measuring conduit, so that the two inputs are brought simultaneously back to atmospheric pressure without therefore creating any danger for the measuring apparatus.

A frequent operating error consists of carrying-out the operation while all the cocks are closed. In this case, as soon as the measuring apparatus is disconnected, the latter is at atmospheric pressure while the other, perfectly isolated, remains at the previous pressure, which may be the high pressure of the tank.

In this case, the measuring apparatus may be damaged.

The foregoing description shows that the prior art does not permit the prevention of damage if the operations are carried out in an incorrect manner. This happens frequently when the staff in charge of the operations are not specialists in the technique of measurements, for example when the storage equipment is only an accessory used by qualified personnel in another field such as the medical field.

It will therefore be understood from the analysis of the errors of operation described above that it is necessary to ensure that the balancing cock is necessarily open from the moment when at least one of the isolating cocks is closed, and that the isolating cocks are necessarily open when the balancing cock is closed.

It could of course be envisaged to use a servocontrol of the pneumatic or electronic type, receiving signals indicating the positions of the cocks and sending control signals acting on pneumatic or electronic motors which actuate the cocks. Systems of this kind are costly, difficult to maintain, necessitate auxiliary equipments and cannot be economically contemplated for the greater part of storage installations.

The invention therefore proposes to remedy the drawbacks previously referred to by providing a simple, reliable and safe device which can be operated without special precautions and without training, utilizing mechanical means only and permitting absolutely sure avoidance of operating errors likely to damage the measuring devices or the storage devices equipped with these measuring devices.

The invention relates to a coupling device for fluids, for example of the kind which connects a level-measuring apparatus to a storage tank, and which is provided with balancing and isolating cocks, this device then comprising according to the invention, a plurality of movable abutments or stops fixed on the operating shafts of the cocks and preventing on the one hand the closure of the balancing cock when at least one of the isolating cocks is closed and on the other hand the closure of each isolating cock when the balancing cock is closed.

In one particular form of the invention, the fluid-transfer device comprises a system of cocks constituted by three cocks of the cock-casing type with vertical shafts, the rotation of which is limited by construction to a quarter turn. The system of movable stops is constituted by manual operating levers for the cocks and the cocks have a precise relative position.

Another form of the invention consists of associating one of the fluid-transfer devices constituting one of the forms of the invention with a measuring apparatus such as for example a mercury U-tube. As this latter apparatus does not generally have its own protection device in the event of excess pressure, it is in fact particularly advantageous to provide it with the fluid-transfer device which constitutes one of the forms of the invention so as to form a compact, independent, sure and reliable measuring device which can be mounted on any apparatus.

Another form of the invention consists of associating the said measuring device with a storage tank so as to constitute a storage device for cryogenic liquid which is particularly reliable. In fact, the association of a mercury U-tube, an apparatus of low cost and simple in operation, with a cryogenic tank presents particular risks with regard to the possible obstruction of the conduits by solidification of the mercury if this latter is expelled into the conduits.

It is than necessary to stop the operation of storage, which may be dangerous in certain applications, and to heat the whole storage apparatus so as to vaporize the cryogenic liquid contained, which may represent a large and expensive loss if the tank is of large size.

The incorporation with this association of a mercury U-tube and a cryogenic tank, of a fluid-transfer device such as that constituting one of the forms of the invention, is thus particularly opportune and advantageous, and permits the formation of a unit in which the various elements are advantageously associated with a view to obtaining great safety and minimum cost.

The characteristic features and advantages of the invention will furthermore be brought out in the description which follows below, by way of example, reference being made to the accompanying drawings, in which:

FIG. 2 is an exploded view of one of the cocks utilized;

FIG. 3 is a perspective view of the cocks and their operating arms, permitting the use, according to the invention, of a measuring apparatus;

Figure 1:
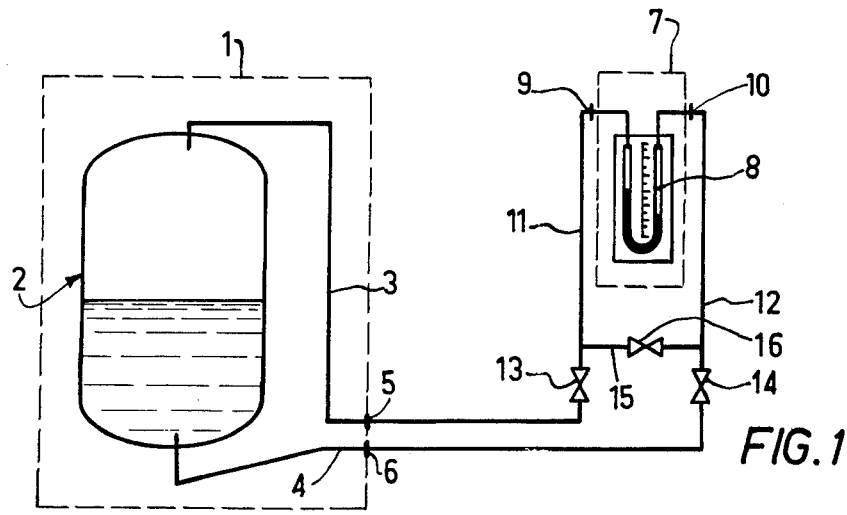
FIG. 1 shows diagrammatically a storage tank for a cryogenic liquid equipped with a level-measuring apparatus of the mercury U-tube type.

In accordance with FIG. 1, a storage device comprises a storage tank 1 for a cryogenic liquid, constituted by a tank 2, thermally insulated, and two outlet conduits 3 and 4 for the tank discharging respectively above the liquid and at the bottom of the tank, and terminating at the outlets 5 and 6, a level-measuring apparatus 7 comprising a mercury U-tube 8 and two inputs 9 and 10.

The outlets 5 and 6 of the output conduits 3 and 4 of the tank are connected to the inputs 9 and 10 of the measuring apparatus by the measuring conduits 11 and 12, of which the arms close to the tank are equipped with isolating cocks 13 and 14. A balancing conduit 15 connects together the two arms of the measuring conduits 11 and 12 close to the measuring apparatus 7 and comprises a balancing cock 16.

The conduit 4 is voluntarily poorly insulated thermally, in order that the liquid becomes vaporized at this point so that at 6 there exists a gaseous phase, the pressure of which is equal to that existing in the liquid phase at the bottom of the tank.

The measurement of the level in the tank 2 is effected by observing the differences of the level of mercury in the tube 8 when the isolating cocks 13 and 14 are open and the balancing cock 16 is closed.

The removal of the measuring apparatus 7 can be effected by disconnecting at 9 and 10 the inputs of the tube 8 and the measuring conduits 11 and 12, the isolating cocks 13 and 14 being closed and the balancing cock 16 being open. It is also possible to disconnect the measuring conduits 11 and 12 at the level of their fixation to the cocks 13 and 14 on the measuring apparatus side.

According to FIG. 2, a plug-cock of the type which can be employed for the equipment of measuring conduits comprises a body 17 with a housing 18 for a plug 19, the said body 17 being traversed by two conduits 20 opening into the interior of the housing 18, and connected to the conduits 11 at the exterior. The body 17 also comprises a nipple 21. The plug 19 is pierced right through with a cylindrical conduit 22 and comprises a square operating shaft 23, on which are fitted successively a sleeve 24 provided with a recess 25 extending over one-quarter of the circumference between two edges 26 and 27, and retained by a ring 28, and a radial operating arm 29 with an extremity 30, the whole being fixed on the shaft by a screw 31 and a washer 32.

In the extreme position of maximum opening of the cock, the position of the plug is such that the conduit 22 is opposite the conduits 20, and the vertical edge 27 is in contact with the nipple 21. In the extreme position of closure, the conduit 22 becomes oriented perpendicular to the conduits 20, so that these conduits 20 are closed by the wall of the plug, and the vertical edge 26 is in contact with the nipple 21.

The passage from one position to the other is effected by rotation of the arm 29 through a quarter turn in the direction indicated by the arrow 33. The opening of the cock is then gradually reduced during the first portion of the rotation, corresponding to a zone of movement of the arm 29 known as the opening movement zone, represented by the angle $x$, up to a position of the moving parts known as the limit opening position, from which the cock is closed during the remainder of the rotation corresponding to a zone of movement of the arm 29 known as the closure movement zone, represented by the angle $y$.

It is clear that the sleeve 24 can be placed in four different ways on the shaft 23. In particular, for a position of assembly of the shaft displaced by a quarter turn with respect to that described above, in the direction of the arrow 33, it is the edge 26 of the recess 25 which comes into contact with the nipple 21. The cock then passes to the closure position by rotating the arm 29 in the direction opposite to the arrow 33, until the edge 27 of the recess 25 is brought into contact with the nipple 21.

It is thus possible to choose the direction of rotation corresponding for example to the closure of the cock, simply by the assembly of the sleeve 24.

It is furthermore clear that the arm 29 which comprises in its lower axial portion a square recess (not shown) which fits exactly on the shaft 23, can be fixed on this shaft in four different positions displaced by a quarter of a turn, without modifying the direction of closure of the cock.

FIG. 3 shows the relative positions of the isolating cocks 13 and 14 and the balancing cock 16 fixed respectively on the conduits 11, 12, and the conduit 15 perpendicular to the preceding. The cocks 13, 14, 16 are of the type described in FIG. 2.

The isolating cock 13 is shown with the plug conduit 22, the sleeve 24 and the operating arm 29 with its extremity 30. The displacement of the arm 29 from the opening position to the closed position is shown by the arrow 33.

The isolating cock 14 is shown with a body 34, a plug conduit 35, a sleeve 36, an operating lever arm 37 with an extremity 38. The movement of the lever 37 from the opening position to the closure position is shown by an arrow 39. The balancing cock 16 is shown with a body 40, a plug conduit 41, an operating lever 42 composed of two symmetrical control arms 43 and 44 with cylindrical extremities 45 and 46. The movement of the lever 42 from the opening position to the closure position is shown by the arrows 47 and 48.

Following the relative arrangement of the plug conduits 22, 41 and 35 with respect to the conduits 11, 15 and 12, it appears that the isolating cocks 13 and 14 are in the extreme position of maximum opening and the balancing cock 16 is in the extreme position of closure.

According to one of the particular features of the invention, the operating arms 29, 43, 44 and 37 are then substantially perpendicular and approximately in the same plane, and the extremities 45 and 46 of the arms 43 and 44 are facing and in the immediate proximity of the arms 29 and 37, in the vicinity of their extremities 30 and 38. If all the arms have the same length, which is the case in FIG. 3, it follows that the shafts of the cocks are substantially in the same plane. In the maximum open positions of the cocks, the radial direction of each of the arms 29, 43, 44 and 37 meets this plane at an angle which is within the range of between 45° and 80°.

According to another particular feature of the invention, the sleeves 24, 34 and 36 have been arranged in such manner that the direction of rotation of the operating arms from the opening position to the closure position is the same, as shown by the arrows 33, 47, 48 and 39, which all rotate in a clockwise direction.

It is clear from FIG. 3 that one of the objects of the invention is achieved: starting from the arrangement shown, it is impossible to open one of the isolating cocks 13 and 14. In fact, it is necessary to move the arms 29 and 37 in the direction of the arrows 33 and 39, and the arms 29 and 37 then come into abutment against the extremities 45 and 46 of the lever 42. The opening of the cocks 13 and 14 can therefore only be effected if the balancing cock 16 has been opened, that is to say the arms 43 and 44 have been moved in a direction opposite to that of the arrows 47 and 48.

Figure 4:
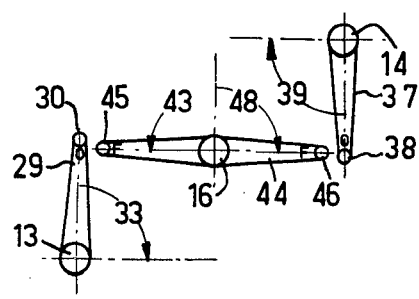
FIGS. 4, 5 and 6 represent diagrammatic views looking from above, of the three cocks, and indicate the relative positions of their operating levers in three characteristic positions.
Figure 5:
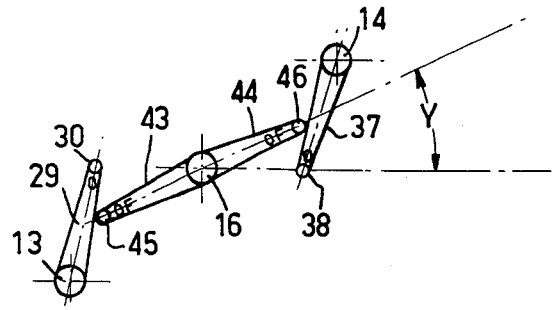
Figure 6:
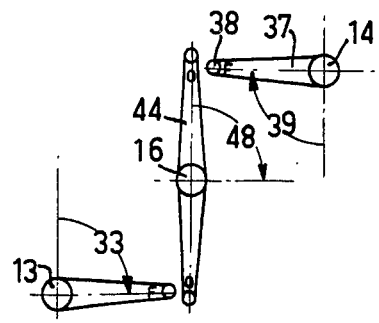

FIGS. 4, 5 and 6 represent diagrammatic views in plan of the device shown in FIG. 3, and show the relative positions of the operating arms.

FIG. 4 shows the operating arms 29, 43, 44 and 37 in the exact position which they occupy in FIG. 3. The isolating cocks 13 and 14 are open as indicated by the letter O at the extremities 38 and 30 and the balancing cock 16 being closed as indicated by the letter F at the extremities 45 and 46 (the so-called measuring position). The possible rotations of the arms in the direction of closure are indicated by the arrows 33, 48 and 39. It is clear that it is impossible, starting from the position shown, to close the cocks 13 and 14 without previously opening the cock 16.

FIG. 5 shows the operating arms 29, 43, 44, 37 with their extremities 30, 45, 46, 38 in an intermediate position, in which the arms are in abutment against each other.

This position is obtained from that shown in FIG. 4 if it is desired to close the isolating cocks 13 and 14. It is then necessary to rotate the arms 43 and 44 in the opening direction, a rotation of the arms 29 and 37 in the direction of closure then being possible. In a first stage, the arms 28 and 37 come into abutment against the extremities 45 and 46 of the arms 43 and 44.

In the position shown, the cocks 13 and 14 are again in the opening position and the balancing cock 16 is at the end of its closure position and at the beginning of its opening position. The angle y represents the travel towards closure of the arm 44. It is clear that starting from the position shown, if for example the arm 29 continues to rotate towards closure, it will push the arm 43 in the direction of opening and the balancing cock 16 will be opened before one of the isolating cocks 13 or 14 is closed, which is one of the objects of the invention.

FIG. 6 shows the position obtained if the movements described above are continued up to the end of travel of the arms. It corresponds to the so-called waiting position, in which the isolating cocks 13 and 14 are closed and the balancing cock 16 is open. It is clear that starting from this position, it is possible to open the isolating cocks 13 and 14 by turning the arms 29 and 37 in the opposite direction to the arrows 33 and 39. On the other hand, it is clear that it is impossible to close the balancing cock 16 by rotating the arm 44 in the direction of the arrow 48 as long as at least one of the isolating cocks remains closed, which is one of the objects proposed by the invention. In fact, the arm 44 for example will come into abutment against the extremity of the arm 37.

It is therefore clear from FIGS. 4, 5 and 6, that the objects of the invention are achieved: if the balancing cock 16 is closed, the isolating cocks 13 and 14 are necessarily both open; if one of the isolating cocks 13 or 14 is closed, or both, the balancing cock 16 is necessarily open.

The invention is of course not limited to the examples described and illustrated, and these can receive various modifications compatible with the scope of the invention. It is obvious for example that the direction of rotation of the cocks described in FIGS. 3, 4, 5 and 6 corresponding to the closure of the cocks could be reversed by an appropriate assembly of the sleeves of the cocks such as 24, as has already been stated. FIGS. 4, 5 and 6 would then be replaced by figures symmetrical with respect to any axis of the plane of the drawings, for example a horizontal axis, the description given above then remaining applicable.

It is also clear from FIG. 3, that a displacement of the operating lever 42 of the cock 16 by a quarter of a turn during its assembly would, if the remainder of FIG. 3 were unchanged, permit rotation of the assembly formed by the body 40, the plug conduit 41, by a quarter of a turn round the shaft of the cock so as to permit the assembly of the cocks according to the invention, on three parallel conduits 11, 12 and 15. Furthermore, it would be possible to fix the isolating cocks 13 and 14 at the extremities of the measuring conduits 11 and 12 in order to connect them directly to the outlets 5 and 6 of the conduits 3 and 4 of the tank.

It is also clear that it would be possible, FIGS. 4, 5 and 6 remaining for example valid, to arrange the arms such as 37 and 44 at different levels and replace the extremities 38 and 46 by cylindrical extremities parallel to the axes of the cocks and sufficiently long to compensate for the difference in level of the arms and to be able to come into contact with the co-operating arm.

What I claim is:

1. A coupling device for fluids, the device comprising a first conduit with a first input and a first outlet, a first isolating cock having a first operating device for opening and closing the first conduit, a second conduit with a second input and a second outlet, a second isolating cock having a second operating device for opening and closing the second conduit, a third conduit connected between said first and second conduits, a balancing cock having a third operating device for opening and closing the third conduit, and closure-preventing means comprising mobile abutment members respectively fixed on the operating devices of each of said cocks, the closure-preventing means preventing the closure of said balancing cock when at least one of said isolating cocks is closed and further preventing the closure of each said isolating cock when said balancing cock is closed, 2. A coupling device for fluids as claimed in claim 1, in which said abutment members comprise two stops fixed respectively on the operating devices of said isolating cocks, and two additional stops rigidly fixed on the rotating operating shaft of said balancing cock.

3. A coupling device for fluids as claimed in claim 2, in which said stops comprise radial arms.

4. A coupling device for fluids as claimed in claim 3, in which the operating devices of said cocks include shafts which are parallel to each other, said radial arms being located substantially in the same plane.

5. A coupling device for fluids as claimed in claim 4, in which the two radial arms of said balancing cock are aligned on opposite sides of the shaft of said balancing cock.

6. A coupling device for fluids as claimed in claim 5, in which each of said cocks includes a plug rigidly fixed on the corresponding shaft, each shaft being rotatable through a limited angle of the order of one-quarter of a turn between an extreme position of maximum opening and an extreme position of closure, all rotations of said shafts from the open position to the closed position being carried out in the same direction.

7. A coupling device for fluids as claimed in claim 6, in which the axes of rotation of the shafts for the isolating cocks are symmetrical with respect to the axis of rotation of the shaft for the balancing cock, the radial arms of said isolating cocks each having the same length, measured from the corresponding axes of rotation, the radial arms of said balancing cock also having the same length measured from the axis of rotation, the directions of said radial arms being parallel when said shafts are in the extreme position of maximum opening.

8. A coupling device for fluids as claimed in claim 7, in which the axes of rotation of the shafts are in the same plane, and the direction of said radial arms when the shafts are in the extreme position of maximum opening, forms with the plane containing the axes of rotation, an angle of between 45° and 80°, the radial arms of said balancing cock in the extreme position of maximum opening respectively intersecting the axial extensions of the radial arms of said isolating cocks in the extreme position of closure.

9. A coupling device for fluids as claimed in claim 7, in which the axes of rotation of the shafts are in the same plane, and all the said radial arms have substantially the same length measured from their axes of rotation, the direction of said radial arms when the shafts are in the extreme position of maximum opening, forming with the plane containing the axis of rotation, an angle slightly greater than 45°, the radial arms of said balancing cock in the extreme position of maximum opening respectively intersecting the axial extensions of the radial arms of said isolating cocks in their extreme position of closure.

10. A coupling device for fluids as claimed in claim 9, in which the distance between the axes of rotation of said shafts is sufficiently small, so that when the balancing cock shaft is maintained in its extreme position of closure, the zone of movement of the radial arms of said isolating cocks is sufficiently small for said isolating cock shafts to then remain open, and so that when either of said isolating cock shafts is in its extreme position of closure, the zone of movement of the radial arms of said balancing cock is sufficiently small for the balancing cock shaft to then remain open.

11. A coupling device for fluids as claimed in claim 10, in which each shaft has a closure movement zone which is sufficiently small for the isolating cock shafts to remain open when the shaft for said balancing cock is in its closure movement zone, and for said balancing cock shaft to remain open when one of the isolating cock shafts is in its closure movement zone.

12. A coupling device for fluids as claimed in claim 1, in which said mobile abutments include manual operating means for said cocks.

13. Fluid coupling apparatus comprising, in combination, first and second fluid conduits, first and second isolating cocks respectively connected to the first and second conduits, a third fluid conduit connected between the first and second conduits, a balancing cock connected to the third conduit, each of the isolating and balancing cocks having an operating member for opening and closing the same, and closure-preventing means cooperating with the operating members of each of the cocks, the closure-preventing means preventing the closing of the balancing cock when at least one of the isolating cocks is closed and also preventing the closing of the isolating cocks when the balancing cock is closed.

14. A device for the measurement of differences in pressure, the device comprising first and second fluid conduits, pressure responsive coupling means interconnecting the first and second conduits, first and second isolating cocks respectively connected to the first and second conduits for controlling fluid pressure applied to the coupling means, a third fluid conduit connected between the first and second conduits, a balancing cock connected to the third conduit for controlling the flow of fluid therein, each of the isolating and balancing cocks having an operating member for opening and closing the same, and closure-preventing means cooperating with the operating members of each of the cocks for preventing the closing of the balancing cock when at least one of the isolating cocks is closed and preventing the closing of the isolating cocks when the balancing cock is closed.

15. A device for the measurement of differences in pressure, the device comprising first and second fluid conduits, pressure responsive coupling means including a U-shaped tube interconnecting the first and second conduits, first and second isolating cocks respectively connected to the first and second conduits for controlling fluid pressure applied to the coupling means, a third fluid conduit connected between the first and second conduits, a balancing cock connected to the third conduit for controlling the flow of fluid therein, each of the isolating and balancing cocks having an operating member for opening and closing the same, and closure-preventing means including a plurality of abutment members respectively affixed to the operating members of each of the cocks, the closure-preventing means preventing the closing of the balancing cock when at least one of the isolating cocks is closed and also preventing the closing of the isolating cocks when the balancing cock is closed.

16. A device as claimed in claim 15, in which the U-shaped tube contains mercury.

17. LIquid storing apparatus comprising, in combination, a liquid storage tank, first and second conduits supplied with pressure from different portions of the storage tank, pressure responsive coupling means interconnecting the first and second conduits, first and second isolating cocks respectively connected to the first and second conduits for controlling fluid pressure applied to the coupling means, a third conduit connected between the first and second conduits, a balancing cock connected to the third conduit, each of the isolating and balancing cocks having an operating member for opening and closing the same, and closure-preventing means including a plurality of abutment members respectively affixed to the operating members of each of the cocks, the closure-preventing means preventing the closing of the balancing cock when at least one of the isolating cocks is closed and also preventing the closing of the isolating cocks when the balancing cock is closed.

* * * * *